May 22, 1928.  1,671,016

F. G. DEWEY

STORAGE BATTERY TERMINAL

Original Filed Dec. 13, 1924

Inventor
Fred G. Dewey
By Spencer Small and Hardman
his Attorneys

Patented May 22, 1928.

1,671,016

UNITED STATES PATENT OFFICE.

FRED G. DEWEY, OF ANDERSON, INDIANA, ASSIGNOR, BY MESNE ASSIGNMENTS, TO DELCO-REMY CORPORATION, OF DAYTON, OHIO, A CORPORATION OF DELAWARE.

STORAGE-BATTERY TERMINAL.

Application filed December 13, 1924, Serial No. 755,661. Renewed February 12, 1927.

This invention relates to storage batteries for automobiles to reduce corrosion of the storage battery terminals.

Further objects and advantages of the present invention will be apparent from the following description, reference being had to the accompanying drawings, wherein a preferred form of embodiment of the present invention is clearly shown.

Figure 1:
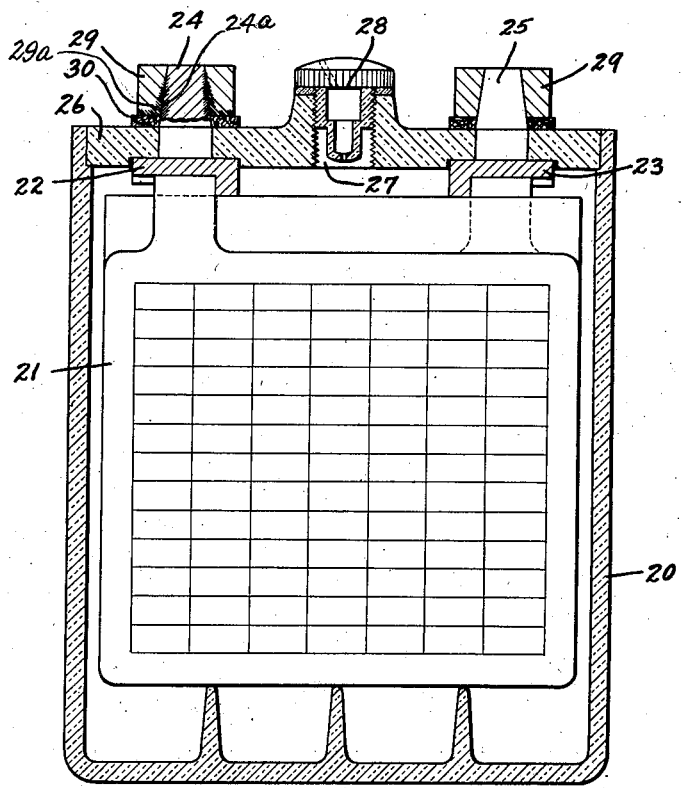
Figure 2:
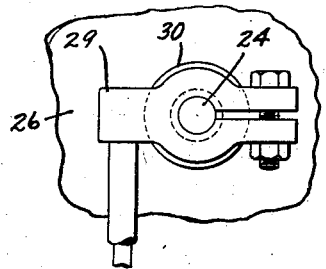

Fig. 1 of the drawings is a sectional view of a storage battery cell provided for the present invention. Fig. 2 is a fragmentary plan view of a cell showing a plan of a terminal post and clip.

Referring to the drawings, 20 designates a storage battery jar for containing an electrolyte and storage battery plates 21 connected with their respective positive and negative connector bars 22 and 23 provided, respectively, with terminal posts 24 and 25. The jar 20 is provided with a cover 26 which is apertured to receive the terminal posts 24 and 25, and is provided with a threaded opening 27 for receiving a plug 28 which is removed when filling the battery cell. The upper ends of posts 24 and 25 are tapered in order to receive terminal clamps 29.

It has been found that corrosion frequently takes place between the terminal clamp and the battery post due to acid working its way upwardly from the battery or the spilling of acid upon the battery cell cover. Generally this corrosion takes place in a region of the post and clamp represented by the closely spaced cross-hatch lines 24ª and 29ª in Fig. 1, and is concealed when the clamp is placed firmly upon the terminal post.

This corrosion is substantially eliminated by the use of a ring 30 of felt or other fibrous absorbent material which is preferably soaked with vaseline or other acid-resisting grease or compound placed between the battery cell cover and the clamp. The presence of the acid-resisting material tends to prevent the acid from creeping up above the felt washer upon the surfaces of contact of the clamp and terminal posts. The fibrous material should be made of acid-resisting fibres, such as woolen fibres.

While the form of embodiment of the invention as herein disclosed, constitutes a preferred form, it is to be understood that other forms might be adopted, all coming within the scope of the claim which follows.

What is claimed is as follows:

The combination with a storage battery having a cover, a terminal post extending exteriorly of the cover, a terminal clamp upon the post, of a washer of acid-resisting fibrous material impregnated with acid-resisting grease located between the clamp and cover and surrounding the post.

In testimony whereof I hereto affix my signature.

FRED G. DEWEY.